A. J. HANNA.
Whiffltree Hook.
No. 102,000. Patented April 19, 1870.
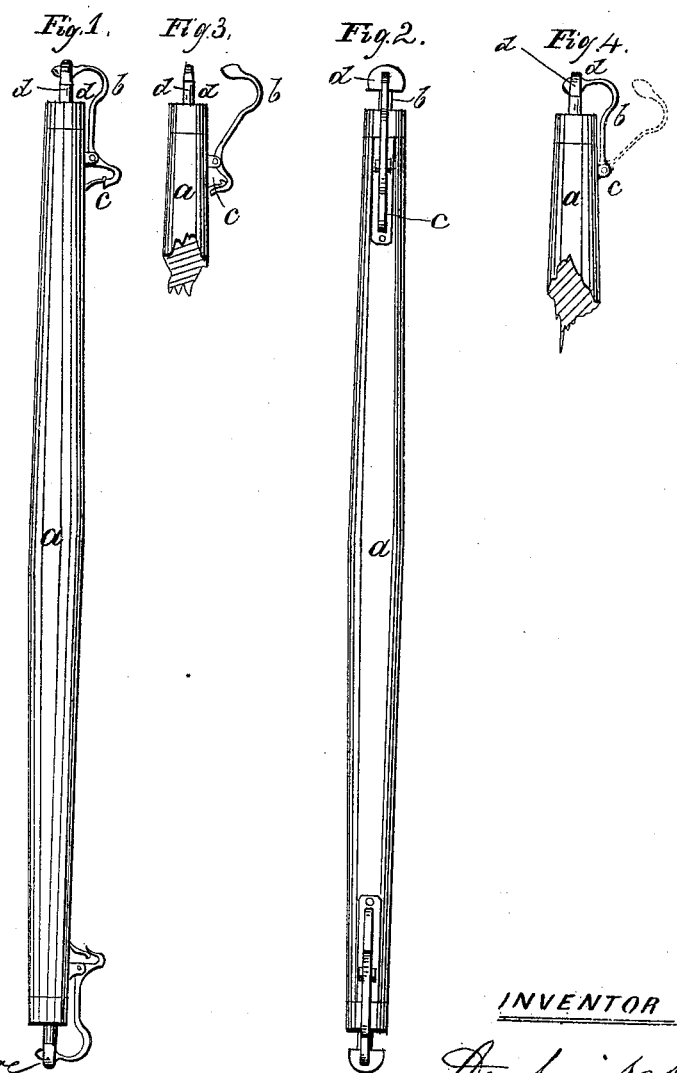

United States Patent Office.

ANDREW J. HANNA, OF NEW GARDEN TOWNSHIP, PENNSYLVANIA.

Letters Patent No. 102,000, dated April 19, 1870.

IMPROVED SINGLE-TREE.

The Schedule referred to in these Letters Patent and making part of the same.

*To all whom it may concern:*

Be it known that I, ANDREW J. HANNA, of New Garden Township, in the county of Chester and State of Pennsylvania, have invented a new and improved Single-Tree; and I do hereby declare that the following is a full, clear, and exact description of the construction and operation of the same, reference being had to the annexed drawings making a part of this specification, in which—

Figure 1 is a front view of the machine embodying my invention.

Figure 2 is a plane view of the same.

Figure 3 is a view of the appliance, opened.

Figure 4 is a view of the same with a different-shaped spring.

Nature and Object of the Invention.

The nature of my invention consists in providing the ends of the single-tree with a dog operated by a spring and entering the hole in the end of the trace-iron.

The object of my invention is to provide a fastener to the trace-iron so that it can be readily opened and shot out of the way when the trace is being put in place, and readily forced back into the trace-iron, and when in that position prevent the trace from slipping off.

General Description.

$a$ is the single-tree;

$b$ is the dog; and $c$, the spring operating the dog; and $D$ is the trace-iron.

I do not claim, broadly, the use of the spring in forcing the catch or dog into place, as I am aware that a device of this nature has been patented by Luther Humiston, March 19, 1861; a similar one by Burrett Goodrich, rejected July 23, 1866; and also by James T. Minard, also rejected, March 25, 1869.

Claim.

What I claim as my invention is—

The employment of a dog, catch, or trigger in combination with a spring, arranged and operating substantially as and for the purposes set forth.

ANDREW J. HANNA.

Witnesses:
J. S. VALENTINE,
WM. B. WIGGINS.